(12) United States Patent
Santamaria et al.

(10) Patent No.: US 9,984,296 B2
(45) Date of Patent: May 29, 2018

(54) MISALIGNED TIRE DETECTION METHOD AND APPARATUS

(71) Applicant: Ford Global Technologies, LLC, Dearborn, MI (US)

(72) Inventors: Omar Santamaria, Huixquilucan (MX); Rodrigo Felix, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/879,537

(22) Filed: Oct. 9, 2015

(65) Prior Publication Data

US 2017/0103268 A1 Apr. 13, 2017

(51) Int. Cl.

| G06K 9/00 | (2006.01) |
|---|---|
| H04N 5/77 | (2006.01) |
| G06K 9/46 | (2006.01) |
| G06K 9/62 | (2006.01) |
| G07C 5/08 | (2006.01) |
| G07C 5/12 | (2006.01) |
| B60W 40/12 | (2012.01) |
| G06T 7/246 | (2017.01) |
| G06F 7/00 | (2006.01) |
| A01B 69/00 | (2006.01) |

(52) U.S. Cl.
CPC ......... *G06K 9/00798* (2013.01); *B60W 40/12* (2013.01); *G06K 9/4604* (2013.01); *G06K 9/6202* (2013.01); *G06T 7/246* (2017.01); *G07C 5/0808* (2013.01); *G07C 5/12* (2013.01); *H04N 5/77* (2013.01); *G06T 2207/30244* (2013.01); *G06T 2207/30256* (2013.01)

(58) Field of Classification Search
CPC ................ G06K 9/00; G06T 7/00; G06F 7/00
USPC ................. 382/103, 104; 701/36, 38, 41, 42
See application file for complete search history.

(56) References Cited

U.S. PATENT DOCUMENTS

| 6,275,753 | B1 * | 8/2001 | Kyrtsos | G01B 21/26 |
|---|---|---|---|---|
| | | | | 701/32.8 |
| 6,546,119 | B2 * | 4/2003 | Ciolli | G08G 1/20 |
| | | | | 382/104 |
| 6,574,539 | B1 * | 6/2003 | Ashrafi | G01M 17/06 |
| | | | | 180/422 |
| 6,650,980 | B2 | 11/2003 | Ashrafi | |
| 6,894,771 | B1 * | 5/2005 | Dorrance | G01B 11/2755 |
| | | | | 33/203.18 |
| 8,930,079 | B2 | 1/2015 | Lee et al. | |
| 2013/0253767 | A1 | 9/2013 | Lee et al. | |
| 2015/0343951 | A1 * | 12/2015 | Kim | B60R 1/00 |
| | | | | 701/42 |

FOREIGN PATENT DOCUMENTS

KR 20140080045 A 6/2014

\* cited by examiner

*Primary Examiner* — Abolfazl Tabatabai
(74) *Attorney, Agent, or Firm* — James P. Muraff; Neal, Gerber & Eisenberg LLP (57) ABSTRACT

An alignment tool is disclosed configured to provide accurate tire alignment analysis based on the comparison of video recordings capturing a direction of travel and data obtained from various vehicle on-board components.

18 Claims, 7 Drawing Sheets

FIG. 10

MISALIGNED TIRE DETECTION METHOD AND APPARATUS

BACKGROUND

Detecting a vehicle's wheel alignment generally requires a detailed analysis of the vehicle's suspension system by taking the vehicle in for service and having the vehicle analyzed by a complex alignment detection machine. However, the present disclosure describes a method, apparatus, and system configured to detect misaligned wheel/tire alignment in a more efficient way by utilizing vehicle on-board components.

SUMMARY

An alignment tool is described herein that is configured to provide accurate tire alignment analysis based on measurements and readings obtained from vehicle on-board components.

Exemplary embodiments provide a vehicle system for determining a tire alignment status based on recorded video data and data received from on-board components. The vehicle system may be comprised of a video recorder configured to capture digital video, a steering wheel angle sensor configured to sense a steering wheel alignment angle, and a processor. The processor may be configured to analyze the digital video to identify a desired feature, select a digital image from the digital video including the desired feature, and determine a tire alignment angle based on pixel placement of the desired feature in the selected digital image.

Exemplary embodiments may also provide a method of tire alignment analysis. The method may comprise controlling a video recorder to capture digital video, controlling a steering wheel sensor to sense a steering wheel alignment angle, analyzing the digital video to identify a desired feature, selecting a digital image from the digital video including the desired feature, and determining a tire alignment angle based on pixel placement of the desired feature in the selected digital image.

This application is defined by the appended claims. The description summarizes aspects of embodiments of the disclosure and should not be used to limit the claims. Other implementations are contemplated in accordance with the techniques described herein, as will be apparent upon examination of the following drawings and description, and such implementations are intended to be within the scope of this disclosure.

BRIEF DESCRIPTION OF THE DRAWINGS

For a better understanding, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

There are shown in the drawings, and will hereinafter be described, some exemplary and non-limiting embodiments, with the understanding that the present disclosure is to be considered an exemplification and is not intended to limit the features described herein to the specific embodiments illustrated. Not all of the components described in this disclosure may be required, however, and some implementations may include additional, different, or fewer components from those expressly described in this disclosure. Variations in the arrangement and type of the components may be made without departing from the spirit or scope of the claims as set forth herein.

An alignment tool is disclosed herein for analyzing information received from various vehicle on-board components and determining a tire alignment status based on the analysis. The alignment tool disclosed herein may be a program or application stored within a memory and executed by a processor communicating with the memory. The alignment tool may also be some combination of software and hardware, incorporated on one or more of the components included in a vehicle operating system. Alternatively, the alignment tool may be incorporated on one or more components that comprise a vehicle operating system and/or offsite server communicating with the vehicle operating system. Further description for the alignment tool and the components of a vehicle operating system involved in running the alignment tool is described in more detail below.

Figure 1:
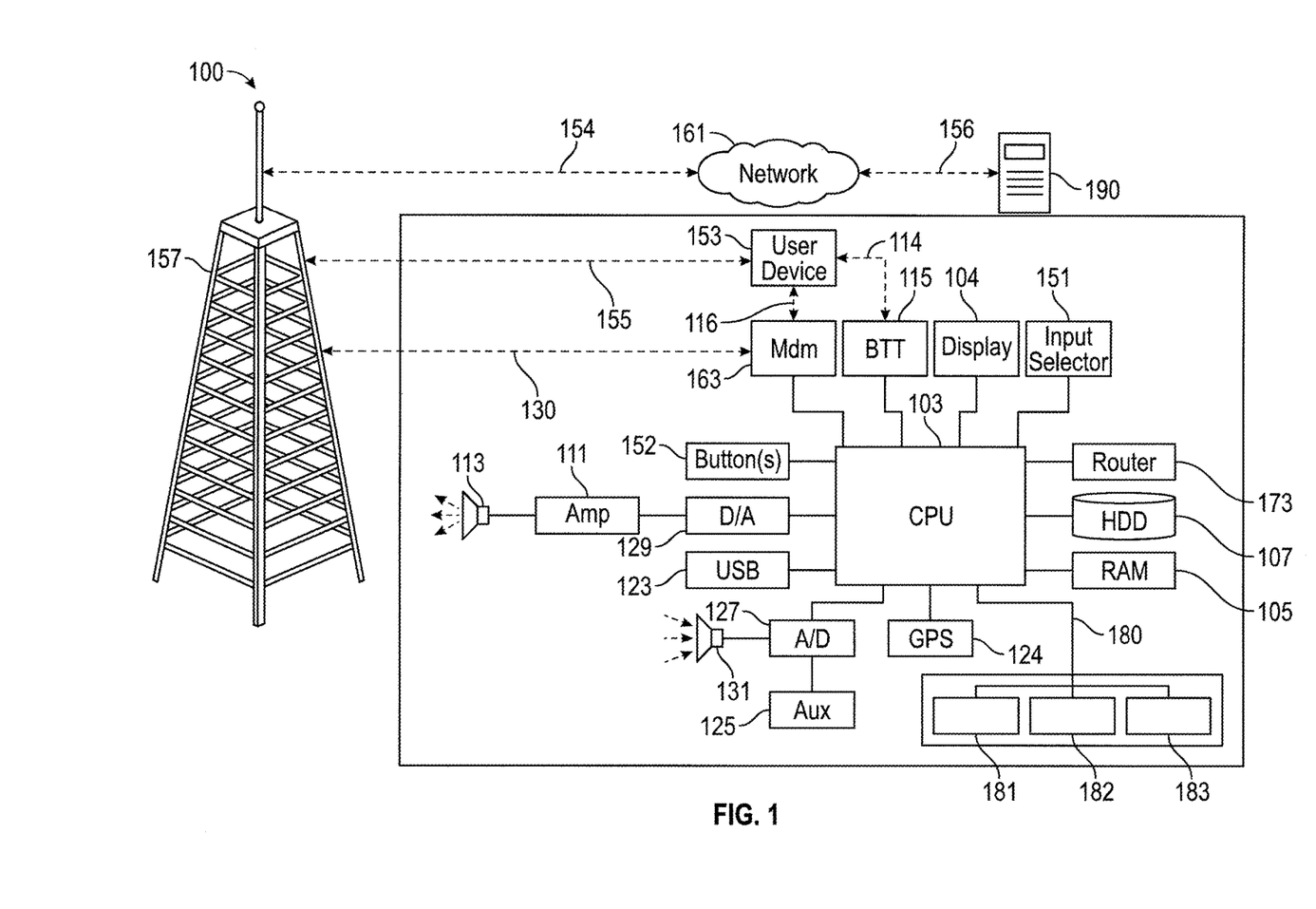
FIG. 1 illustrates an exemplary block diagram of a vehicle operating system communicating with a network, according to some embodiments.

FIG. 1 illustrates a block diagram of a vehicle operating system 100 which is a vehicle-based computing system configured to communicate with various other vehicle components. The vehicle operating system 100 may, according to some embodiments, be part of the vehicle's infotainment system. One example of an infotainment system is the SYNC® system manufactured by the FORD MOTOR COMPANY® (SYNC® and FORD MOTOR COMPANY® are registered trademarks of the Ford Motor Company). Other embodiments of the vehicle operating system 100 may include different, fewer, or additional components than those described below and shown in FIG. 1.

The vehicle operating system 100 illustrated in FIG. 1 includes: (1) a processor 103; (2) a display 104; (3) a non-persistent memory device 105; (4) a persistent memory device 107; (5) an amplifier 111; (6) a speaker 113; (7) a BLUETOOTH® transceiver 115 (BLUETOOTH® is a registered trademark of Bluetooth SIG, Inc.); (8) a modem 163; (9) a USB port 123; (10) a GPS device 124; (11) an auxiliary input 125; (12) an analog-to-digital converter 127; (13) a digital-to-analog converter 129; (14) a microphone 131; (15) an input selector 151; (16) one or more buttons 152; and (17) a vehicle-based wireless router 173 having a WiFi transceiver (not shown). Certain components of the vehicle operating system 100 may use a vehicle network bus 180 (e.g., such as but not limited to a controller area network (CAN bus)) to pass data to and from one another and to other vehicle components. For example, FIG. 1 illustrates that processor 103 is in communication with a dashboard camera 181, an accelerometer 182, and a steering wheel angle sensor 183 via the vehicle network bus 180.

The processor 103 at least partially controls operation of the different components of the vehicle operating system 100. The processor 103 enables processing of commands and routines onboard the vehicle. The processor 103 may be any suitable processing device or set of processing devices, such as but not limited to a microprocessor, a microcontroller-based platform, a suitable integrated circuit, or one or more application-specific integrated circuits (ASICs) connected to and configured to execute a set of instructions stored on one of the memory devices 105 and 107. The instructions may include software for operating the vehicle operating system 100. For example, the instructions may include specific instructions for operating the alignment tool described herein.

In this exemplary embodiment, the non-persistent memory device 105 may be random access memory (RAM), such as non-volatile RAM, magnetic RAM, ferroelectric RAM, or any other suitable forms. The persistent memory device 107 may be a hard disk drive (HDD) or any other suitable memory, such as but not limited to flash memory, an EPROM, an EEPROM, a memristor-based non-volatile solid-state memory, unalterable memory, or read-only memory.

The vehicle operating system 100 includes a variety of different input devices that enable a user to provide an input to the vehicle operating system 100. Here, the input devices include the USB port 123, the auxiliary input 125, the microphone 131, and the buttons 152. Other input devices may include but are not limited to one or more control knobs, an instrument panel, a keyboard, a scanner, a digital camera for image capture and/or visual command recognition, a touch screen, a mouse, or a touchpad.

The USB port 123 may be configured to receive a USB interface to enable communication between a remote device connected to the USB interface and the vehicle operating system 100. For instance, the USB port 123 can receive a USB interface of or connected to a portable hard drive (i.e., a computer-readable medium) to enable data stored on the portable hard drive to be uploaded to the persistent memory 107 of the vehicle operating system 100.

The auxiliary input 125 may be configured to receive a wireless or wired input from an auxiliary device, such as a personal media player, a wireless health device, or a portable computing device (e.g., smartphone, PDA, or laptop). The auxiliary input 125 may pass the input as an analog signal to the analog-to-digital converter 127. When required, the analog-to-digital converter 127 converts the analog signal into a digital signal before passing the digital signal to the processor 103.

The microphone 131 is configured to receive sound (e.g., a user's speech), which it passes as an analog signal to the analog-to-digital converter 127. The analog-to-digital converter 127 converts the analog signal into a digital signal before passing the digital signal to the processor 103.

The buttons 152 may be any suitable buttons, such as but not limited to hard keys, soft keys, and virtual keys displayed on a display that are actuatable by a user to provide input to the vehicle operating system 100.

The input selector 151 is manipulatable to enable the user to choose how the user desires to provide an input to the vehicle operating system 100 by switching between various input options. For example, the user could manipulate the input selector 151 to activate the microphone 131 to enable the user to provide a speech command to the vehicle operating system 100 or to initiate pairing of the user device 153 and the vehicle operating system 100.

The vehicle operating system 100 includes a variety of different output devices configured to output information observable by the user. Here, the output devices include the display 104 and the speaker 113, though the vehicle operating system 100 may include any other suitable output devices. The display 104 may be any suitable display device, such as but not limited to an LCD, an OLED, a flat panel display, a solid state display, a cathode ray tube (CRT), or a heads-up display. The speaker 113 may be any suitable speaker or other stereo system component configured to output audio. Specifically, the processor 103 passes a digital signal to the digital-to-analog converter 109. The digital-to-analog converter 109 converts the digital signal to an analog signal, which it passes to the speaker 113. The speaker 113 outputs the analog signal as audio.

The vehicle operating system 100 includes a variety of different communication interfaces, each of which includes a wired and/or a wireless interface to enable communication between the vehicle operating system 100 and one or more remote devices, such as but not limited to a user device 153 (e.g., a cell phone, a smart phone, a personal digital assistant, or a laptop computer); a telecommunications tower 157 (e.g., cellular tower); or a WiFi access point (not shown). Here, the communication interfaces include the BLUETOOTH® transceiver 115, the modem 163, the GPS device 124, and the router 173, though the vehicle operating system 100 may include any other suitable communication interfaces.

The BLUETOOTH® transceiver 115 enables the vehicle operating system 100 to pair with the user device 153 so the user device 153 and vehicle operating system 100 can communicate with each other. Specifically, the BLUETOOTH® transceiver 115 can pair with a BLUETOOTH® transceiver (not shown) of the user device 153 (as is known in the art). Once paired, the vehicle operating system 100 and the user device 153 can communicate with one another, represented by signal 114. In certain embodiments, the BLUETOOTH® transceiver 115 initiates the pairing, such as following receipt of an input from the user or automatically after recognizing the BLUETOOTH® transceiver of the user device 153 is within a suitable range. In other embodiments, the BLUETOOTH® transceiver of the user device 153 initiates the pairing, such as following receipt of an input from the user or automatically after recognizing the BLUETOOTH® transceiver 115 of the vehicle operating system 100 is within a suitable range.

Once the vehicle operating system 100 and the user device 153 are paired, the vehicle operating system 100 can communicate through the user device 153 with an external network 161. For example, the user device 153 can communicate with the external network 161 via the telecommunications tower 157 (or a WiFi access point), represented by signals 155 and 159. When the user device 153 is paired with the vehicle operating system 100, the vehicle operating system 100 can communicate with the external network 161 via its ability to communicate with the user device 153, as represented by signal 116. Once paired, the vehicle operating system 100 and the external network 161 may communicate in any suitable manner, such as but not limited to by using a data plan, data over voice, or dual tone multi frequency tones.

In certain embodiments, the processor 103 runs an operating system including an application program interface (API) to communicate with application software. The application software may access an embedded module or firmware on the BLUETOOTH® transceiver 115 to enable wireless communication between the BLUETOOTH® transceiver 115 and the BLUETOOTH® transceiver of the user device 153. BLUETOOTH® is a subset of the IEEE 802 personal area network (PAN) protocols. IEEE 802 local area network (LAN) protocols include WiFi and have considerable cross-functionality with IEEE 802 PAN. Both are suitable for wireless communication within a vehicle. Other communication methods that can be used are free-space optical communication (such as infrared data association) and non-standardized consumer infrared protocols.

The external network 161 may be a collection of one or more networks, including standards-based networks (e.g., 2G, 3G, 4G, Universal Mobile Telecommunications System (UMTS), Global System for Mobile Communications (GSM), Long Term Evolution (LTE), and the like); WiMAX; BLUETOOTH®; near field communication (NFC); WiFi (including 802.11 a/b/g/n/ac or others); WiGig; Global Positioning System (GPS) networks; and the like. Further, the external network 161 may be a public network, such as the Internet; a private network, such as an intranet; or combinations thereof, and may utilize a variety of networking protocols now available or later developed including, but not limited to, TCP/IP-based networking protocols.

The modem 163 enables the vehicle operating system 100 to communicate with the external network 161 either through the user device 153, or directly through the modem 163 itself. In various embodiments, the modem 163 enables the vehicle operating system 100 to communicate with the external network 161 via the user device 153. For example, the user device 153 can communicate with the external network 161 via the telecommunications tower 157 (or a WiFi access point), represented by signals 155 and 159. When the user device 153 is connected to the modem 163, the vehicle operating system 100 can communicate with the external network 161 via its ability to communicate with the user device 153 over the voice band, as represented by signal 116. In other embodiments, the modem 163 enables the vehicle operating system 100 to communicate with the external network 161 by bypassing the user device 153 and directly communicating with the telecommunications tower 157 (or a WiFi access point), represented by signals 130 and 159.

The modem may communicate with an offsite neuronal server 190 via telecommunications tower 157, as represented, for example, by signals 130, 159 and 156. The offsite neuronal server 190 may be comprised of a network interface configured to communicate with network 161, a memory configured to store instructions for analyzing information received from vehicle operating system 100 as well as specific instructions for running a portion of the alignment tool described herein, and a processor configured to communicate with the memory and execute the instructions stored on the memory.

In other embodiments, the user device 153 includes a modem for voice band or broadband data communication. In the data-over-voice embodiment, a technique known as frequency division multiplexing may be implemented when the user of the user device 153 can talk over the user device 153 while data is being transferred. At other times, when the user is not using the user device 153, the data transfer can use the whole bandwidth (300 Hz to 3.4 kHz in one example). While frequency division multiplexing may be common for analog cellular communication between the vehicle and the Internet, and is still used, it has been largely replaced by hybrids of with Code Domain Multiple Access (CDMA), Time Domain Multiple Access (TDMA), or Space-Domain Multiple Access (SDMA) for digital cellular communication. These are all ITU IMT-2000 (3G) compliant standards, and offer data rates up to 2 Mbit/s for stationary or walking users and 385 kbit/s for users in a moving vehicle. 3G standards are now being replaced by IMT-Advanced (4G) which offers 100 Mbit/s for users in a vehicle and 1 Gbit/s for stationary users. If the user has a data-plan associated with the user device 153, the data-plan may allow for broadband transmission and the vehicle operating system 100 could use a much wider bandwidth (speeding up data transfer). In still another embodiment, the user device 153 may be replaced with a cellular communication device (not shown) that is installed in the vehicle itself.

The GPS device 124 may include a GPS receiver and a GPS antenna (not shown) configured to communicate with one or more satellites to enable determination of the vehicle's location.

The vehicle-based wireless router 173 and WiFi transceiver enable the vehicle operating system 100 to directly connect to a WiFi network (not shown).

In addition to having exemplary processes executed by the vehicle operating system 100, in certain embodiments, the exemplary processes may be executed by a computing system in communication with the vehicle operating system 100. This computing system may include, but is not limited to, a wireless device (e.g., a mobile phone) or a remote computing system (e.g., a server) connected through the wireless device. Collectively, such systems may be referred to as vehicle associated computing systems (VACS). In certain embodiments, particular components of the VACS may perform particular portions of a process depending on the particular implementation of the system. For example, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle operating system 100 located within the vehicle itself is capable of performing the exemplary processes.

Figure 2:
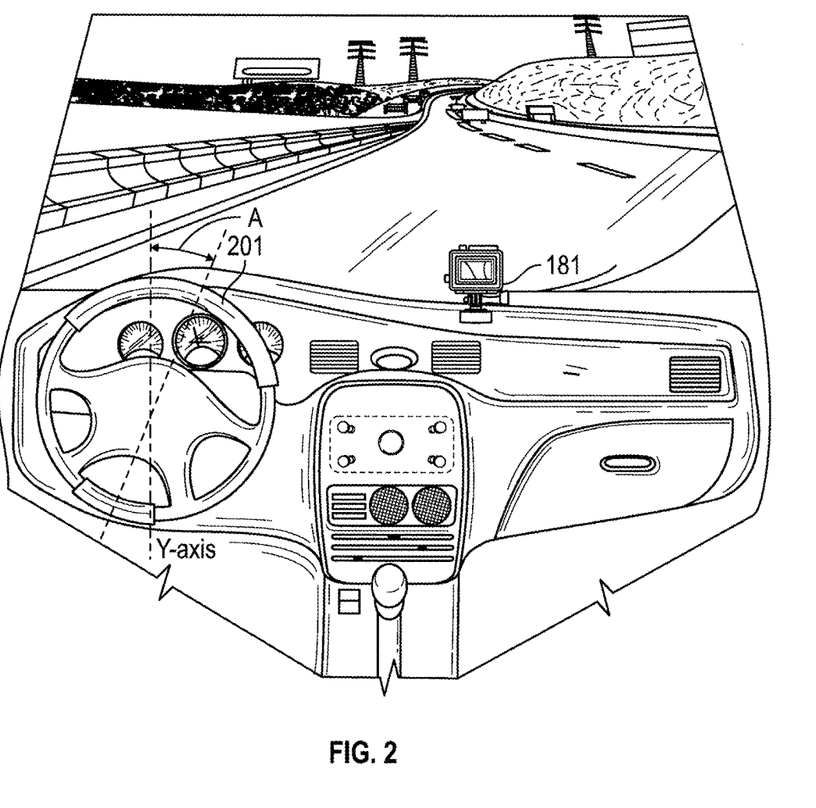
FIG. 2 illustrates an exemplary view from a vehicle cabin, according to some embodiments.

FIG. 2 illustrates an exemplary vehicle cabin view depicting a vehicle cabin for a vehicle. The vehicle may be configured to comprise one or more components of vehicle operating system 100 described herein. The vehicle cabin view illustrates steering wheel 201 and dashboard camera 181, where dashboard camera corresponds to dashboard camera 181 of the vehicle operating system 100 illustrated in FIG. 1. An embodiment of the alignment tool may be executed by the processor 103 to receive video recording data from the dashboard camera 181, receive steering wheel angle information from steering wheel angle sensor 183, and acceleration information from accelerometer 182. The dashboard camera 181 may be installed within the vehicle cabin to face out of the front windshield to capture video images of an approaching environment as the vehicle travels forward. The steering wheel angle sensor 183 is configured to measure an angle A of the steering wheel 201 with respect to, for example, a vertical y-axis. The angle A may correspond to a current steering wheel alignment setting or mechanical positioning being sensed by the steering wheel angle sensor 183. The accelerometer 182 is configured to sense an acceleration of the vehicle as the vehicle moves in a direction of travel.

Although the dashboard camera 181 is depicted within the vehicle cabin, according to other embodiments the dashboard camera 181 may be located in other vehicle positions capable of capturing video recordings of the vehicle's upcoming direction of travel. For example, the dashboard camera 181 may be installed on the vehicle's front grill or front bumper.

The alignment tool may then analyze the received data and information to determine a tire alignment status of a wheel and tire assembly of the vehicle.

Figure 3:
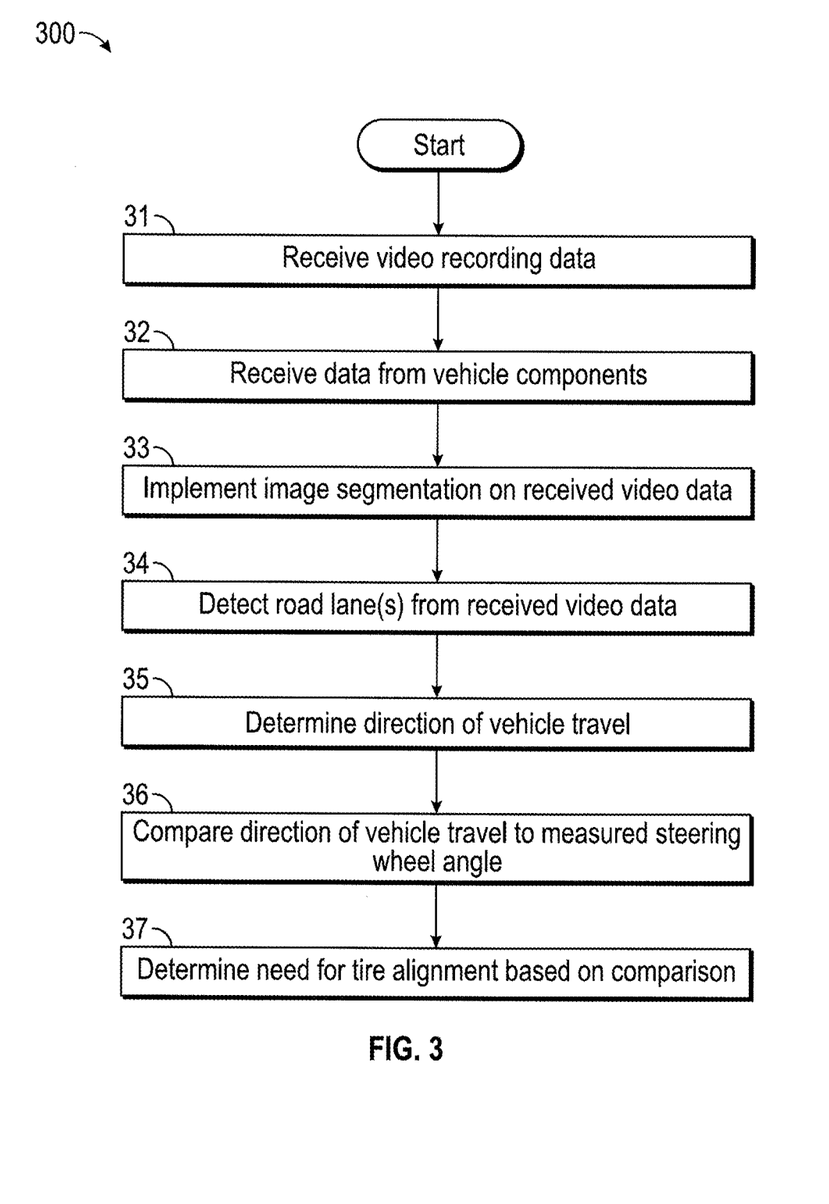
FIG. 3 illustrates a flowchart describing a process for determining a tire alignment status, according to some embodiments.

FIG. 3 illustrates a flowchart 300 that describes an exemplary process for determining a tire alignment status. The process described by flowchart 300 may be implemented by the alignment tool described herein.

At 31, the alignment tool may receive video recording data. The video recording data may have been recorded by dashboard camera 181 and stored, at least temporarily, on non-persistent memory device 105, persistent memory device 107, or a memory comprising dashboard camera 181. The video recording data may have captured a plurality of images viewable out a front windshield of the vehicle, as illustrated, for example, in FIG. 2.

At 32, the alignment tool may receive additional data from one or more vehicle components that comprise vehicle operating system 100. For example, alignment tool may receive steering wheel angle information measured by steering wheel angle sensor 183. In addition, alignment tool may further receive vehicle acceleration data measured by accelerometer 182. The vehicle acceleration data may be in the form of acceleration vector information that the alignment tool may reference to segregate instances of vehicle skidding (i.e., where vehicle travel direction would differ greatly from steering wheel input without it meaning the steering system is misaligned) from valid instances of vehicle misalignment.

Figure 4:
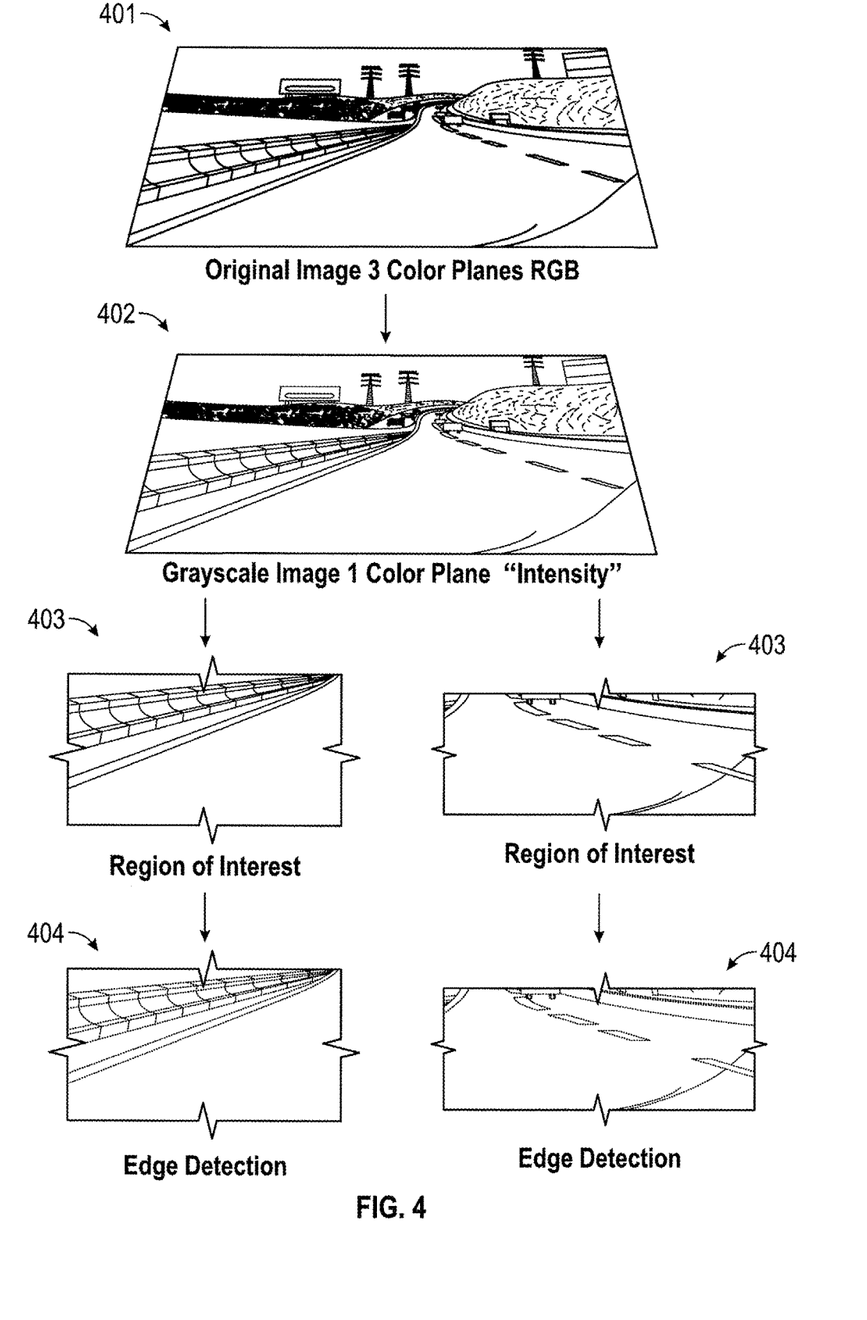
FIG. 4 illustrates exemplary processes for performing image segmentation analysis and corresponding digital image edits, according to some embodiments.

At 33, the alignment tool may implement an image segmentation analysis on the received video recording data. For example, FIG. 4 illustrates a series of processes that may be implemented by the alignment tool to perform the image segmentation analysis on the received video recording data according to some embodiments. At 401, the image segmentation process receives original digital images that comprise the video recording data. The original digital images may remain in a colored color space (e.g., images may be in a three color plane RGB color space or a four color plane CMYK color space). At 402, the alignment tool may convert the original digital images from the colored color space to grayscale digital images in a single color plane (e.g., the single color plane may correspond to an intensity component of the color space). At 403, the alignment tool may parse the digital images to identify and select portions of the digital image that include a region of interest. A region of interest may correspond to road segments identified from the digital images that include at least a portion of a road edge. A road edge may be either a road lane edge (i.e., outer edge of a road identifiable by solid line), or a road divider line (i.e., road divider line for dividing lanes going in the same direction, or opposite direction, identifiable by dashed lines). At 404, alignment tool may further implement a two-tone conversion on the digital images so that the digital images that have been selected are converted to a two tone image (e.g., black and white contrasting image).

Figure 5:
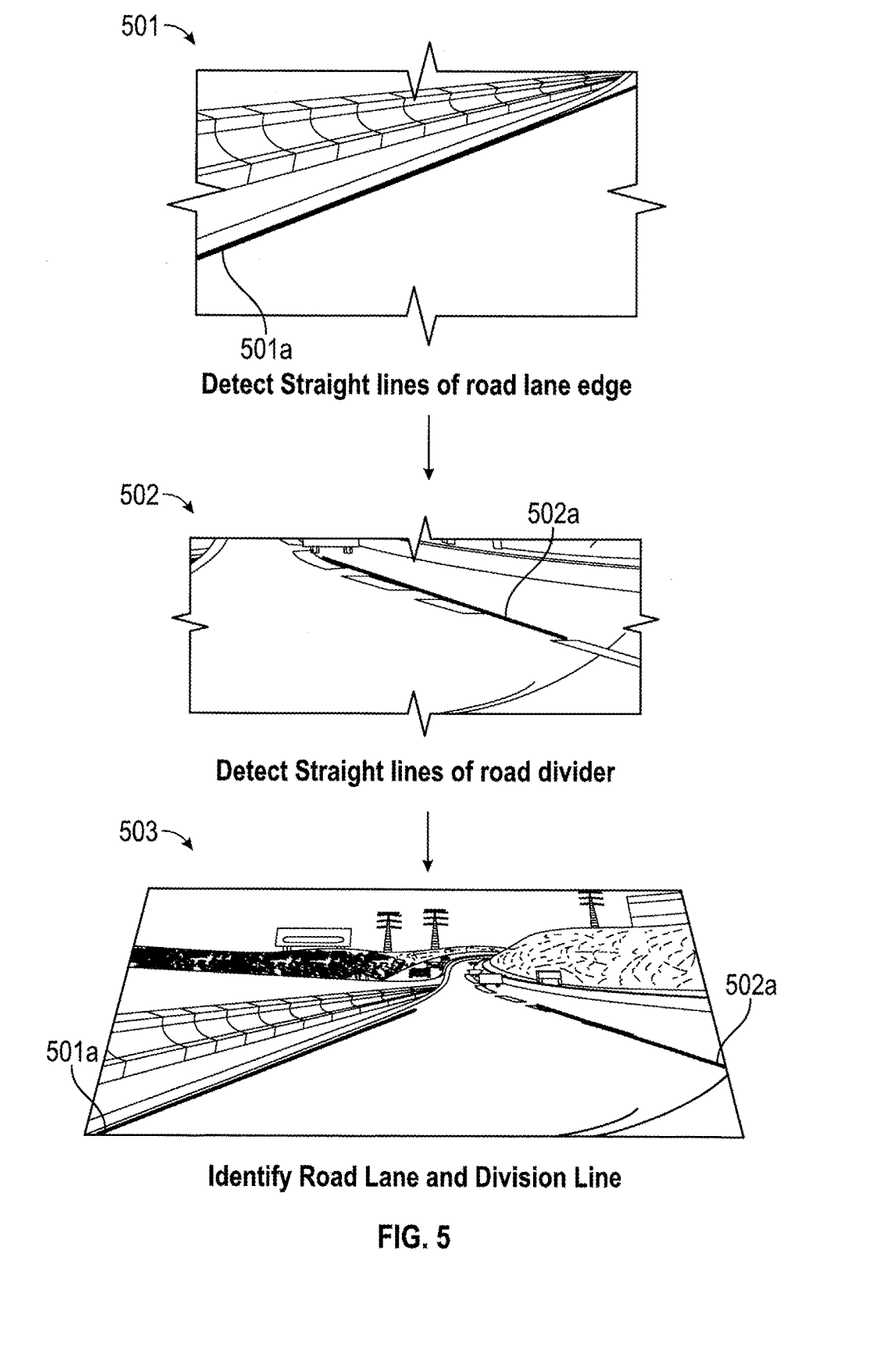
FIG. 5 illustrates exemplary processes for performing lane detection analysis and corresponding digital image edits, according to some embodiments.

Referring back to flow chart 300, at 34 the alignment tool may perform a lane detection analysis that detects road lane(s) from the received video recording data. For example, FIG. 5 illustrates a series of processes that may be implemented by the alignment tool to perform the lane detection analysis on the received video recording data according to some embodiments. At 501, the alignment tool may analyze the digital images to identify straight road lane edge line 501*a*. The digital image analyzed at 501 may correspond to the two-tone digital image described at 404 of FIG. 4. Referring back to 501, the straight road lane edge line 501*a* may correspond to the outer edges of a road being traveled on by the vehicle, and may be identifiable as a solid white line. At 502, the alignment tool may analyze the digital images to identify a divider road lane edge line 502*a*. The digital image analyzed at 502 may correspond to the two-tone digital image described at 404 of FIG. 4. Referring back to 501, the divider road lane edge line 502*a* may correspond to divider lines found in-between the road lane edge lines, and may be identifiable as dashed white lines. At 503, alignment tool has successfully identified straight road lane edge line 501*a* and divider road lane edge line 502*a*.

Referring back to flow chart 300, at 35 the alignment tool determines a direction of travel for the vehicle based on an analysis of the received video recording data. For example, a further analysis of the identified straight road lane edge line 501*a* and divider road lane edge line 502*a* from the digital images at 503 may enable the alignment tool to determine the direction of travel. More specifically, the alignment tool may track pixel positions for one or more pixels in the identified straight road lane edge line 501*a* and divider road lane edge line 502*a* to determine whether the vehicle is traveling on a straight stretch of road, a left bending stretch of road, or a right bending stretch of road.

Figure 8:
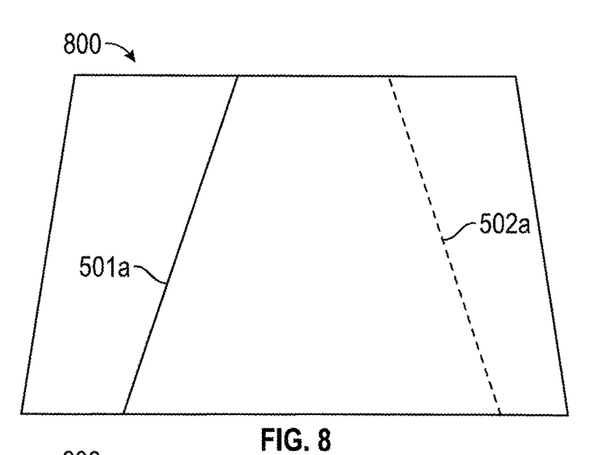
FIG. 8 illustrates an exemplary digital image depicting a straight road portion in a taken from a view out the front windshield of the vehicle cabin.
Figure 9:
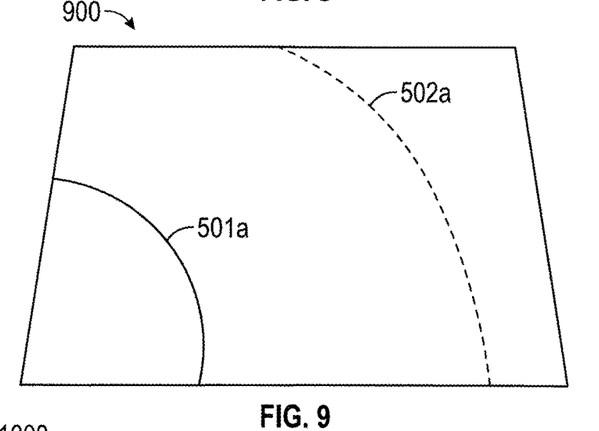
FIG. 9 illustrates an exemplary digital image depicting a left turning road portion taken from a view out the front windshield of the vehicle cabin.
Figure 10:
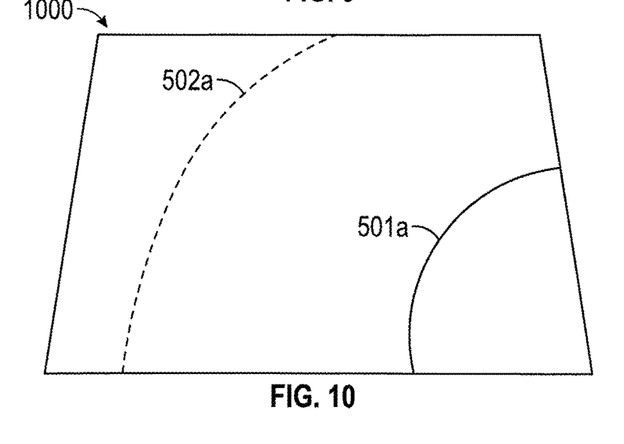
FIG. 10 illustrates an exemplary digital image depicting a right turning road portion taken from a view out the front windshield of the vehicle cabin.

For example, the alignment tool may recognize that pixels comprising the straight road lane edge line 501*a* exits the digital image at roughly the same mirroring location where pixels that comprise the divider road lane edge line 502*a* exits the digital image. Recognizing this situation, the alignment tool may determine that the vehicle's direction of travel is straight. This scenario is exemplified by the exemplary digital image 800 illustrated in FIG. 8. In this way, alignment tool identifies road edges (e.g., straight road lane edge lines and divider road lane lines), and then references pixel placement of the identified road edges to determine a direction of travel for the vehicle. FIG. 9 illustrates an exemplary digital image 900 where the straight road lane edge line 501*a* and divider road lane edge line 502*a* correspond to the vehicle traveling in a left bending turn, such that the alignment tool may determine the vehicle's direction of travel is left. FIG. 10 illustrates an exemplary digital image 1000 where the straight road lane edge line 501*a* and divider road lane edge line 502*a* correspond to the vehicle traveling in a right bending turn, such that the alignment tool may determine the vehicle's direction of travel is left. The vehicle's direction of travel determined by the alignment tool at 35 may correspond to an alignment of the vehicle's tires. Although reference is made to the vehicle's tire alignment, the tire alignment may correspond to an alignment of the vehicle's wheel, tire, and suspension system.

It follows that the direction of travel determined by the alignment tool at 37 may be understood to be a tire alignment angle for purposes of further analysis, described in more detail below.

Referring back to flow chart 300, at 36 the alignment tool may compare the determined tire alignment angle (i.e., the determined direction of travel) with the steering wheel angle measurement received from the steering wheel angle sensor 183. A default table that associates a plurality of vehicle steering wheel angles with corresponding tire alignment angles may be stored on a vehicle memory (e.g., non-persistent memory 105 or persistent memory 107). More specifically, the default table may represent steering wheel angles and a range of associated tire alignment angles that are predetermined to be acceptable such that the tires may still be considered to be aligned. Therefore the comparison at 36 may include looking up the determined steering wheel angle in the default table to determine whether the determined tire alignment angle is within the range of acceptable tire alignment angles for the determined steering wheel angle.

For example, if the determined steering wheel angle is $\Theta_{sw}$, a lookup on the default table may find that steering wheel angle $\Theta_{sw}$ is associated with an acceptable range of tire alignment angles corresponding to angles $\Theta_{t1}$ to $\Theta_{t2}$. Therefore the comparison may look to determine whether the determined tire alignment angle is within the range of angles $\Theta_{t1}$ to $\Theta_{t2}$ that correspond to a range of acceptable tire alignment angles for the determined steering wheel angle to still be considered properly aligned.

At 37, the alignment tool determines a misalignment between the tires and steering wheel exists when, for example, the determined tire alignment angle is not within the range of acceptable tire alignment angles $\Theta_{t1}$ to $\Theta_{t2}$ for the determined steering wheel angle $\Theta_{sw}$. When the alignment tool determines a misalignment exists, the alignment tool may generate a notification message indicating tire alignment is needed. The notification message may, for example, be displayed on display 104, or audibly output through speaker 113.

The features implemented by the alignment tool above may be accomplished with a fewer, or greater, number of processes than those expressly described in flow chart 300.

Figure 6:
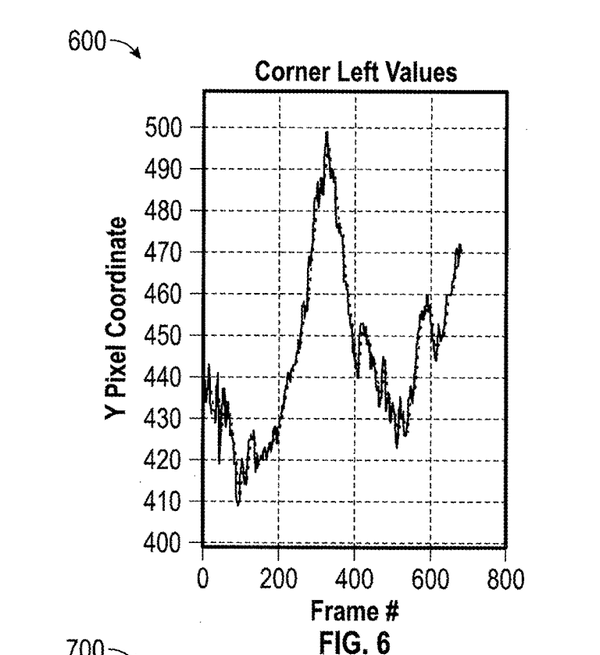
FIG. 6 illustrates an exemplary graph plotting pixel coordinates for a digital image edited according to the process for determining a tire alignment status.

FIG. 6 illustrates graph 600 that depicts pixel placement data for a road lane edge line identified in a left-side portion for an exemplary digital image described with reference to flow chart 300 above. The alignment tool may analyze graph 600 and identify pixel placement patterns that may correspond to a straight road segment, a slope in the road entering a right-hand turn, and a stabilized right turn road segment. For example, in graph 600, frames 0-290 may be identified by alignment tool as corresponding to a straight road segment, frames 291-328 may be identified by alignment tool as corresponding to a slope in the road entering a right-hand turn, and frames 329-onward may be identified by the alignment tool as corresponding to a stabilized right turn road segment.

According to some embodiments, the alignment tool may control the upload of graph 600, the digital image corresponding to graph 600, and/or analysis information identifying specific pixel graph patterns that have been determined to correspond to specific tire alignment angles to an offsite server such as neuronal server 190. By doing so, alignment tool is able to store a database of alignment information that may be referenced in future alignment analyses. These analyses, based on Artificial Intelligence techniques, will detect and learn alignment patterns to account for variations in pixel positions due to wear and tear of the suspension and steering components. For example, if the vehicle is deemed to be properly aligned and at rest, but the acceleration vector information indicates a weight direction beyond downward vertical (which would translate into body roll of the vehicle, and therefore corresponding roll of the view being captured by the camera 181) the systems uploads this variation to the processing server to adapt the pixel detection routine accordingly.

Figure 7:
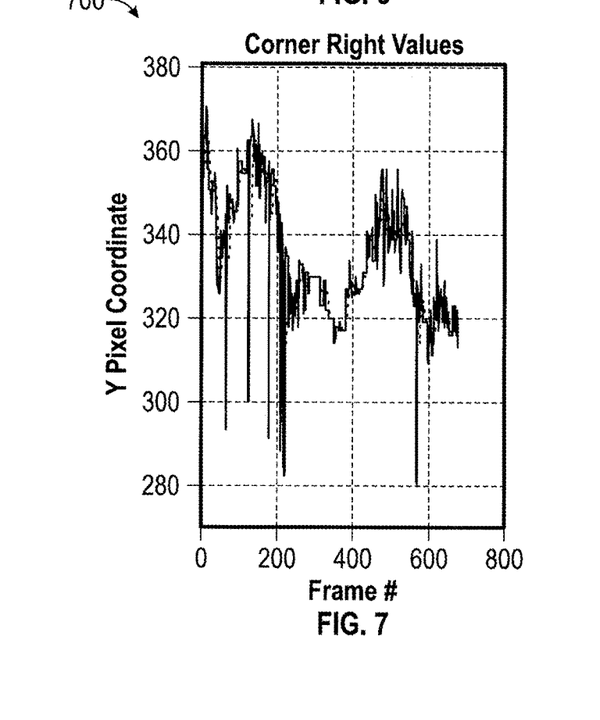
FIG. 7 illustrates an exemplary graph plotting pixel coordinates for a digital image edited according to the process for determining a tire alignment status

FIG. 7 illustrates graph 700 that depicts pixel placement data for a road lane edge line identified in a right-side portion for the exemplary digital image described with reference to graph 600 in FIG. 6 above. It is noted that due to camera angles that may be off center based on a placement of dashboard camera 181, the pixel placement data for the left-side portion and right-side portion of the same exemplary digital image may not be equal. However, the pixel data for the road lane edge lines found in the left-side portion and right-side portion of the same exemplary digital image will be affected in a similar manner to reflect a same direction of travel for the vehicle.

Any process descriptions or blocks in the figures, should be understood as representing modules, segments, or portions of code which include one or more executable instructions, executable by a computing device, processor, or controller (e.g., control unit), for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, are merely set forth for a clear understanding of the principles of this disclosure. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle system comprising:
   an angle sensor positioned to measure an alignment angle of a steering wheel;
   memory including a table associating each of a plurality of the alignment angles with a range of acceptable tire alignment angles; and
   a processor configured to:
      select an image including a lane edge from video captured by a camera; and
      determine a tire alignment angle based on pixel placement of the lane edge in the image.

2. The vehicle system of claim 1, wherein the memory is configured to store a digital video.

3. The vehicle system of claim 1, wherein the processor is configured to detect the lane edge from the selected image.

4. The vehicle system of claim 1, wherein the processor is configured to:
   identify pixels comprising the lane edge;
   determine locations at which pixels comprising lane edge leave the selected image; and determine the tire alignment angle based on the determined locations at which pixels comprising the lane edge leave the selected image.

5. The vehicle system of claim 3, wherein lane edge corresponds to at least one of a solid outer road edge line or a dashed divider road line.

6. The vehicle system of claim 1, wherein the processor is configured to:
compare the determined tire alignment angle to the steering wheel alignment angle; and
determine whether a tire misalignment exists based on the comparison.

7. The vehicle system of claim 6, further comprising a display device; and
wherein the processor is configured to control display of a notification message on the display device identifying the tire misalignment exists when the tire misalignment is determined to exist.

8. The vehicle system of claim 1, wherein the processor is configured to:
parse the table to identify a default steering wheel angle corresponding to the alignment angle of the steering wheel;
identify the range of acceptable default tire alignment angles corresponding to the default steering wheel angle in the table;
compare the determined tire alignment angle to the range of acceptable default tire alignment angles; and
determine a misalignment exists when the determined tire alignment angle is outside the range of acceptable default tire alignment angles.

9. The vehicle system of claim 1, further comprising a modem configured to communicate with a neuronal server;
wherein the processor is configured to control the modem to upload the selected image to the neuronal server.

10. A method of tire alignment analysis, the method comprising:
capturing, with a camera, video;
measuring, with a steering wheel angle sensor, an alignment angle of a steering wheel;
accessing, in memory, a default table that includes a plurality of default steering wheel angles each having assigned a range of acceptable default tire alignment angles;
analyzing, with a processor, the video to identify a desired feature;
selecting an image from the video including the desired feature; and
determining a tire alignment angle based on pixel placement of the desired feature in the selected image.

11. The method of claim 10, wherein the camera is positioned within a vehicle cabin to record out a front windshield.

12. The method of claim 10, wherein the desired feature is a road edge line, and the method further comprises detecting at least one road edge line from the selected image.

13. The method of claim 12, further comprising:
identifying pixels comprising the at least one road edge line;
determining locations at which pixels comprising the at least one road edge line leave the selected digital image; and
determining the tire alignment angle based on the determined locations at which pixels comprising the at least one road edge line leave the selected digital image.

14. The method of claim 12, wherein the at least one road edge line corresponds to at least one of a solid outer road edge line or a dashed divider road line.

15. The method of claim 10, further comprising:
comparing the determined tire alignment angle to the steering wheel alignment angle; and
determining whether a tire misalignment exists based on the comparison.

16. The method of claim 15, further comprising:
generating a notification message identifying the tire misalignment exists when the tire misalignment is determined to exist; and
displaying, on a display device, the notification message when the tire misalignment is determined to exist.

17. The method of claim 10, further comprising:
parsing the default table to identify a default steering wheel angle corresponding to the steering wheel alignment angle;
identifying a range of acceptable default tire alignment angles corresponding to the default steering wheel angle in the default table;
comparing the determined tire alignment angle to the range of acceptable default tire alignment angles; and
determining a misalignment exists when the determined tire alignment angle is outside the range of acceptable default tire alignment angles.

18. The method of claim 10, further comprising:
controlling a modem to upload the selected digital image to a neuronal server.

* * * * *